United States Patent
Edenson et al.

(10) Patent No.: US 6,198,875 B1
(45) Date of Patent: *Mar. 6, 2001

(54) TIRIS BASED BIOS FOR PROTECTION OF "COPYRIGHTED" PROGRAM MATERIAL

(75) Inventors: Roy I. Edenson, Richardson; Madhu Nerlikar, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/994,414

(22) Filed: Dec. 19, 1997

Related U.S. Application Data

(60) Provisional application No. 60/033,543, filed on Dec. 20, 1996.

(51) Int. Cl.[7] .............................. H04N 5/76; G11B 23/28
(52) U.S. Cl. ......................... 386/94; 380/203; 380/270; 360/60
(58) Field of Search .................. 386/94; 380/3, 380/4, 49; 348/5.5; 369/58, 14; 360/60

(56) References Cited

U.S. PATENT DOCUMENTS

| | | | |
|---|---|---|---|
| 4,864,494 | 9/1989 | Kobus, Jr. ............................ | 364/200 |
| 5,394,469 | 2/1995 | Nagel et al. ........................... | 380/4 |
| 5,473,687 | 12/1995 | Lipscomb et al. .................... | 380/4 |
| 5,592,549 | 1/1997 | Nagel et al. ........................... | 380/4 |
| 5,905,798 | * 5/1999 | Nerlikar et al. . | |

OTHER PUBLICATIONS

Felica –Remote Card System –Sony Remote Card System, Next Generation forContactless Smartcard, SONY –Sony Corporation, Tokyo, 141, Japan.

US. application No. 08/850,535, Nerliker et al., filed May 1997.

* cited by examiner

*Primary Examiner*—Thai Tran
(74) *Attorney, Agent, or Firm*—Pedro P. Hernandez; W. James Brady, III; Frederick J. Telecky, Jr.

(57) ABSTRACT

The invention consists of attaching or embedding a "TIRIS" transponder (or other RF or IR or barcode or other identifying device) physically into the center of the proposed DVD disk. Once a disk is input to a media player, the interrogation portion of the media player transmits an interrogation signal to the transponder located on the disk. Once empowered with the interrogation signal, the transponder accesses the predetermined address, code word, encryption algorithms, media type information, and copyright information from it's memory. Then the transponder transmits the address, the code word, encryption algorithms, media type information and copyright information to the interrogator, located within the media player, and the interrogator sends the transponder data stream to a conditional access management processor(CAMP). Simultaneously with the processing action of the CAMP, the interrogator instructs the player to access the data__word at the predetermined address on the disk and the player accesses the data__word on the disk. The media player only plays if there is a match between the read data__word and received code word and the received algorithm correctly decrypts the content of the media prior to decoding.

9 Claims, 2 Drawing Sheets

TIRIS BASED BIOS FOR PROTECTION OF "COPYRIGHTED" PROGRAM MATERIAL

This application claims priority under 35 USC § 119 (e)(1) of provisional application No. 60/033,543, filed Dec. 20, 1996.

FIELD OF THE INVENTION

This invention relates in general to the use of RF-ID systems for security purposes and more specifically for securing the intellectual property value of copyrighted material.

BACKGROUND OF THE INVENTION

RF-ID systems are increasingly being used for more and a wider range of applications. In a typical RF-ID system, an interrogator transmits an interrogation signal, to a transponder, within read range of the interrogator, and the transponder responds by transmitting it's identification number either by backscattering the interrogation signal, in a full duplex mode, or by the transponder actually transmitting it's identification signal after being powered up by the interrogation signal in a half duplex mode. RF-ID technology has found a niche in the security market. Transponders are easily attached to security badges, toll tags, or gate passes to allow/prohibit access or even provide automatic billing services, i.e. toll roads and parking garages, and readers are as readily constructed into toll booths, and doorways. On an even smaller scale, RF-ID systems can provide security and tracking capabilities for a wide variety of goods. Warehouses, libraries, and manufacturing plants are all potential venues with regard to the tracking aspect of RF-ID systems. However, with respect to the security aspect of RF-ID systems, the tracking and security of Secret or Top Secret government documents, is one of the areas which focuses on allowing or prohibiting access to a physical object, i.e. document. An even further extension from tracking and securing an object, is to allow only "original" copyrighted objects, i.e. Digital Video Disk (DVD) and Digital Videocassette (DV) to be played on players, i.e. DVD players.

The current methodologies available for exercising copyright/anti-tape protections can be characterized as mostly deterrents constituting little more than "Warning Labels". This program material is mostly analog, "branded" multimedia content such as prerecorded VHS tapes of major studio motion pictures, CDs, cassettes, broadcast movies via cable/satellite channels, etc. Recording artists, major studios and the like have tolerated such inadequate safeguards because until recently the copied product resultant was degraded in quality sufficiently such that it could not duplicate the quality of the original Master material itself. In fact, there is a government act, the HRA ACT of 1992 which allows one analog copy of a copyrighted work to be made and played at a time (i.e., if you leave your cassette in the car and it melts, the ACT allows you to make another copy for your use, but it does not permit the making of several copies for sale).

The explosion of removable digital media in the marketplace today has increased the convenience of storing and using such devices for a wide variety of publication purposes. In particular optical disk media represents a relatively low cost method of publishing mass quantities of digital data and information. The nature of this "published" or compiled information can vary significantly, from movie entertainment to games, to interactive training, to X-rays or other image files. The copying of optical disk media is the most difficult form of media copyright violation to protect against since making optical copies of an original disk also copies the protection schemes onto subsequent counterfeit media. In addition, if the protection scheme is digital, hackers may be able to get around the security and circumvent the protection. Unlike analog copies, due to the intrinsic nature of "perfect" digital copies, the duplicates cannot be differentiated from the originals. Additionally, the redistribution and or reformatting of these copies in an unauthorized manner represents a further threat of revenue loss and misrepresentation of the legal rights of the owners' authentic property.

In one solution to the optical disk counterfeit problem, proposed in co-pending application Ser. No. 60/016,745, filed on May, 2, 1996 and assigned to Texas Instruments Inc, TIRIScypher is introduced wherein a TIRIS transponder is embedded into the media and upon insertion of the media into a media player, the media player interrogates the transponder which responds with an address of a data-word, located on the media itself, and a code word. The media player then locates the data-word at that particular address on the media and if there is a match between the received codeword and read data-word, then the media player will play the media. TIRIScypher has the ability to deter production of counterfeit disks because the TIRIS transponder cannot be optically copied and the encryption code data is not easily hacked especially due to zero knowledge techniques that can be employed using the RF link between transponder and transceiver. This code data, if deployed using a full integrated architecture, can be prevented from appearing on the host machine's data bus altogether, thereby isolating it from external access, hacking and/or corruption. The problems associated with this solution are that the largest portion of the financial burden lies with the players or periphery devices which perform some function on the copyrighted media and the greatest benefit would be conferred upon the copyright holders, i.e. the Motion Picture Association of America. For example, if the media were Digital Video Disks, the only cost increase to the copyright holders would be the addition of a transponder to the media itself, maybe $1. On the other hand, the periphery device manufacturer must add an interrogator to it's DVD player and possibly additional circuitry which allows for the read of a particular address on the disk at a potential incremental cost of hundreds of dollars to the standard DVD player. Therein lies the issue.

In matters where such publication methods are employed on copyrighted or sensitive source data, some improved method of guaranteeing the control and distribution of such data needs to be employed that is independent of the actual data contained on the data tracks of the media. Further, a method of insuring use of the copyrighted works should both be robust and highly resistant to either software or hardware hacking. A breach would render the protection system useless and expose the rightful owners to copyright infringement or the like. Therefore, a totally effective system should provide dimensions of counterfeit protection, and copy control capability.

SUMMARY OF THE INVENTION

The system of protection described below offers additional potential benefits for all stakeholders in the value chain, including inventory control, pay-per-use pricing transactions, tiered level access control and demographic data gathering. The unique nature of the TIRIS cypher (Texas Instruments Registration and Identification System)

approach enables new levels of sophistication in the control and tracking of packaged media material, in order to allow copyright owners to add greater value and protection. TIRIS cypher is a flat batteryless radio-frequency semiconductor transponder package which is bonded or embedded to the center of a copyrighted DVD media. Encrypted with a variety of encoded and/or scrambled information bits that can only be read with a TIRIS transceiver, located in the player, the disk is checked for authenticity.

The invention consists of a hard disk drive architecture which includes a level of intelligence to be downloaded from the transponder into the hard disk drive. The periphery devices of the future will be able to distinguish which form of media has been inserted into the periphery device. For example, upon insertion of a DVD disk into a DVD player, the player would read the transponder located on the media device, even before enabling the player, and that read would provide the BIOS, operating set-up, necessary to play the DVD disk. Where BIOS is traditionally located on the hard drive or in this example, in the player, having the BIOS located on the media element transfers the responsibility of protecting the media against counterfeit reproductions back to the copyright holders. Within the context of the BIOS, the copyright holders would define many operating parameters such as the type of media to be performed upon, how many copies, if any, are allowed, at what point in time the media is enabled, i.e. to handle regional releases etc. More specifically, the decryption key(s) and/or various algorithms reside on the transponder itself, thereby allowing a DVD player or drive to load such a decryption algorithm (or it's pointer) into it's resident flash ROM enabling a resident Conditional Access Management Processor (C.A.M.P.) to perform individual content dependent decryption and/or descrambling, decoding, etc. from disk to disk.

DETAILED DESCRIPTION OF THE PREFERRED EMBODIMENTS

Figure 1:
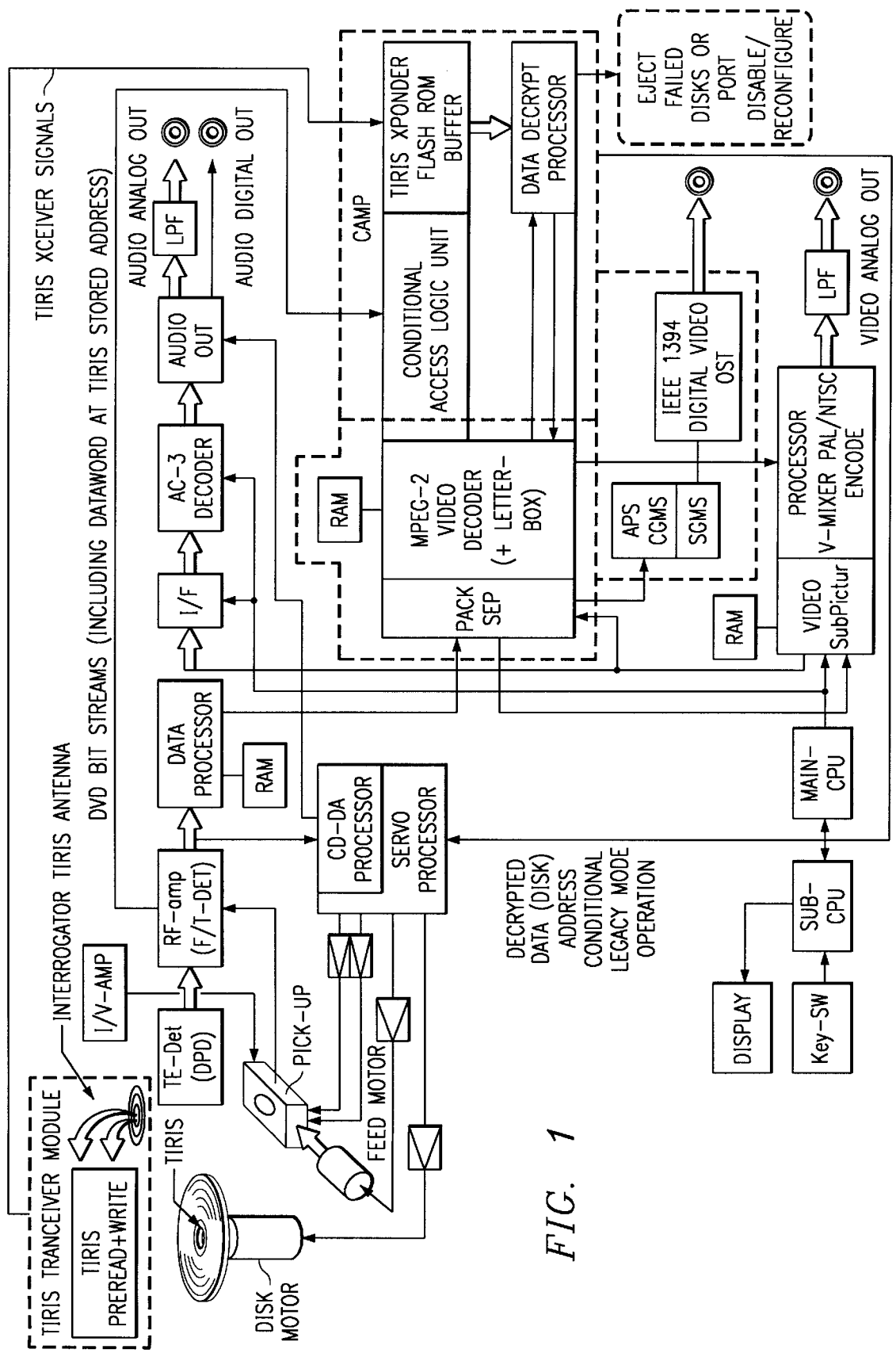
FIG. 1 shows a block diagram of a DVD player(ROM type for published media) plus the TIRIS cypher.

A TIRIS-like embedded transponder (flat and circular type ... about 1" in diameter and about .=0.5 mm thick) can be implemented for various digital storage media during the media production phase. A single page baseline transponder may have from 256 bits to 512 bits of memory. These bits will be allocated to store at least a unique ID/serial #, a code word, media type, decryption algorithm, copyright information, and an "encoded or encrypted" address location within the media itself etc. This disk address serves as a pointer to a specific data_word which is embedded anywhere within the disk's program material. This unique data_word contained on the disk within the digital data stream (not yet accessible to the viewer of the program content until after authentication is verified) is then compared with a preassigned code word located in the memory of the transponder itself. If decryption of the code word and other transponder response signals and continuous decryption of the DVD bit stream (including the data_word stored at the predetermined address) occurs and there is there is a match between the media data_word and the code word, then authentication is complete, affording play access to the content.

However, if the match between the data-word and code word fails and/or the algorithm transmitted by the transponder fails to decrypt the DVD bit stream such that decoding is not possible, then several approaches may be taken. Most simply, the DVD will not be played. A signal will be sent to either eject the failed disk or reconfigure the Video ports such that the output port is disabled or otherwise reconfigured.

The invention will be described with more specificity herein. A hard disk drive architecture which includes a level of intelligence to be downloaded from the transponder into the hard disk drive is disclosed. The periphery devices of the future will be able to distinguish which form of media has been inserted into the periphery device. For example, upon insertion of a DVD disk into a DVD player, the player would read the transponder located on the media device, even before enabling the player, and that read would provide the BIOS, operating set-up, necessary to play the DVD disk. Where BIOS is traditionally located on the hard drive or in this example, in the player, having the BIOS located on the media element transfers the responsibility of protecting the media against counterfeit reproductions back to the copyright holders. Within the context of the BIOS, the copyright holders would define many operating parameters such as the type of media to be performed upon, how many copies, if any, are allowed, at what point in time the media is enabled, i.e. to handle regional releases etc. More specifically, the decryption key resides on the transponder itself, thereby allowing a DVD player or drive to load such a decryption algorithm (or it's pointer) into it's resident flash ROM enabling a resident Conditional Access Management Processor (C.A.M.P.) to perform individual content dependent decryption from disk to disk. In this way, the responsibility for the complexity or lack thereof of the media content encryption, i.e. from none to 32 bits, is transferred back on the copyright owners who define the encryption details when the media is being manufactured. Therefore the amount of security desired can be personally defined by each copyright holder.

Figure 2:
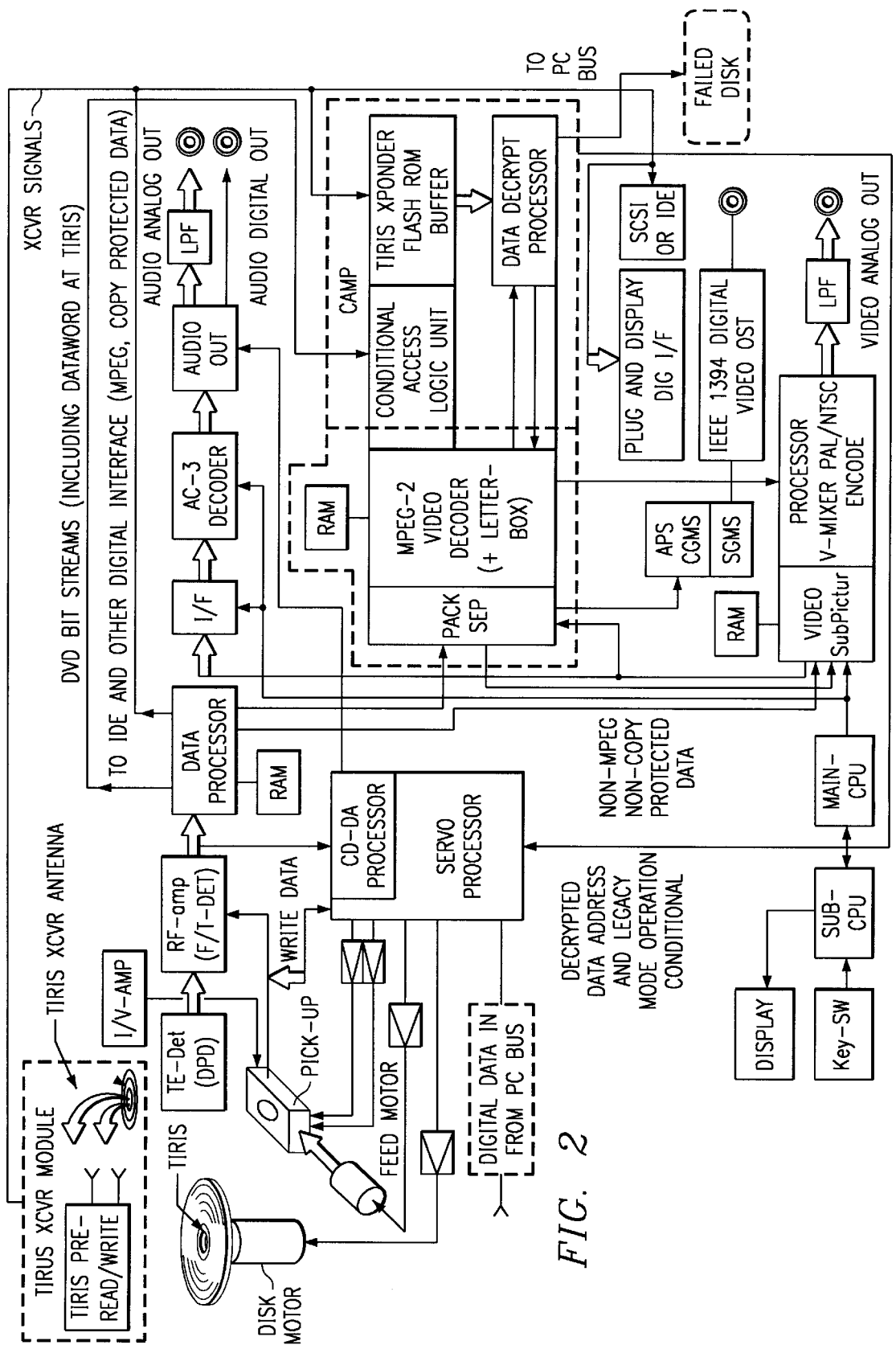
FIG. 2 shows a block diagram of a DVD RAM drive (Rewritable Optical) plus the TIRIS cypher.

The CAMP comprises at least the following elements, as depicted in FIGS. 1 and 2, a conditional access logic unit and a TIRIS transponder FLASH ROM buffer. A conditional access logic unit is found in the CAMP for receiving the DVD bit streams which include the TIRIS dataword located at some predetermined address and all the digital content of the DVD from the disk reader. Even before the reading of the disk, the interrogator within the disk reader is interrogating the transponder located on the disk and the transponder is transmitting back to the interrogator the transponder response data stream comprising the Code Word, address of the data-word, media type information, decryption algorithm and copyright information etc. or in other words the BIOS or set-up information for the Conditional Access Management processor(CAMP). Within the CAMP, the transponder response data stream is stored in a FLASH ROM buffer which supplies a data decryption processor with the stored data for preparing the player to process(decrypt, descramble and decode) the digital media.

The preparation of the player comprises a variety of tasks including setting up the MPEG-2 decoder to properly decode the digital media, configuring the ports to either eject a failed disk or reconfigure existing ports to inhibit play, and if the media is of a legacy variety(predates TIRIS implementation of disks), then allowing play in the conditional legacy mode of operation. Even setting up the MPEG-2 decoder takes steps because depending upon which type of media is presented, the MPEG-2 processor must be set up differently. For example, if the media element is a digital video disk(DVD), the MPEG-2 decoder must be set up much differently than if decoding a digital music disk. In addition, the decryption algorithm defines the algorithm used to decrypt the digital content of the media, the media type information provides distinct set-up parameters for the processor depending upon the type of media being played, and the copyright information provides, for example, the number of plays allowed. Upon the transponder response data stream being input to the data decryption processor, the entire transponder response data stream in addition to the entire DVD bit streams(including the embedded data-word) are descrambled or decrypted prior to decoding the bit streams. A FLASH ROM buffer is the buffer memory of choice due to the capability of FLASH ROM to blow or program a large amount of data at once. Therefore, a portion of the Drive/Servo Digital Signal Processor (DSP) can act as a "vessel" of sorts prescribing the processing dictated by the content provider(i.e. MGM) to perform the decryption or descrambling prior to decoding(i.e. Motion Pictures Experts Group (MPEG)-2).

Alternatively, the illegally copied disk would be recognized without TIRIS and no decryption algorithm would be available to descramble the MPEG data stream. Additionally, instructions within the periphery device could force the disk to be ejected upon failing to meet the required legacy(prior to TIRIScypher) or TIRIS authentication tests. Also, output port disabling and or interface reconfiguration may be employed upon detection of either counterfeit media, or time/use count expired media or media intended for controlled or limited distribution(time or usage based).

A legally recorded but non-encrypted disk could be allowed to playback the MPEG data stream, however not through the hardware MPEG decoder built into the drive, but rather through MPEG software decoding if available elsewhere, i.e. in the host machine microprocessor. This would serve to encourage Hard Disk Drive (HDD) manufacturers to include the TIRIS based configuration hardware in their drive designs in order to playback Motion Picture Association of America (MPAA) sanctioned media (copyprotected with decryption data embedded in the media's transponder), however, would allow other drives to be built for less cost that would rely on software decoding and could not deal with further encryption except if a decryption code is carried in software elsewhere.

An example of an intended bit allocation scheme of the transponder response data stream is as follows. Note that in this example, the use of the first 32 bits of the transponder response datastream may comprise product tracking data which could provide detailed logging information regarding the manufacturing and inventory control of copyrighted material. Just some examples noted, are product SKU, Batch #, Date and Location Code. The central 160 bits of data are dedicated to the 64 bit physical address of the data_word on the DVD itself and the next 64 bits are assigned to a TIRIS transponder code word. The final 32 bits comprise a 32 bit algorithm used to encrypt the entire transponder response data stream as well as the entire DVD bit stream. Continuing with this example, the last 64 bits (as shown in FIG. 1) could be reserved to contain post-manufactured rewritable data, such as the run/elapsed viewing; time counter to count the number of times the media has been played or used, i.e. to enable pay-per-view pricing, or limit the number of authorized runs for a run-specific pricing, and also store the number of "write" cycles. More advanced readers could make use of these bits to provide remotely controlled polling capability, as the tracking of media usage moves away from broadcast only based viewing measurement organizations such as Nielson, as well as the after ticket sales.

Additionally, real-time usage data, trends from the transaction audit trail created by this system, would enable the user real-time Nielson like(audience/user preference tracking) rating for feedback to the copyright, content owners, retailers OEMs etc. The player with the TIRIS system can be polled real-time (through the two-way communication link of the network card) to provide appropriate advertising feeds to that target audience. This is an extra benefit to the advertisers for product branding, promotions, etc.

An additional feature for the DVD or media player owner would be to utilize the TIRIS transponder information along with media based information to create a personal media content library management function.

To further protect the integrity of the security scheme, the TIRIS reader/interrogator function and the matching process must be completed internally i.e. on the internal communications bus of the interrogation IC. The Motion Pictures Expert Group (MPEG) decoder could also be located within the intelligence of the media player as well, so that attempts to break the code and to defeat the protection would be extremely difficult(no digital bits 'in the clear' to handle). Integration of the TIRIS interrogator/reader and MPEG decoder on a single IC chip is highly desirable since such configurations would help assure copyright protection.

In the event of a successful authentication, the usage and other user-bit counters, and the writable elements of the transponder can be accessible in the value chain, such as retailers, renters, resellers, end-users and content providers or their agents, i.e. intellectual property/royalty collection third parties or agents, etc. In the event of a "branded" content non-match of authenticity, the DVD player could indicate detection of an "unauthorized program copy". The TIRIS reader then would switch to a prerecorded copyright warning/notice location, possibly stored as an on screen display (OSD) message.

For high end applications i.e. using read/write, multipage transponder, inventory control, logistic and retail management functionality is possible, with implementation benefiting retailers, equipment manufacturers (hardware OEMs), resellers and redistributors also a reality. The "prelocated origin data" such as the date/place of manufacture, edition/ catalogue numbers, may be embedded and encrypted into the DVD to provide excellent legacy system override for older already owned legitimate media. The upcoming DVD players are expected to be able to differentiate between various media types.

If the media type is determined to be an earlier type (as in music CDs or CD ROMs), the DVD player/TIRIS reader of course would not need to decode an MPEG data stream and therefore would allow normal playback of such material in the legacy mode of operation. In the legacy mode of operation, as shown in FIGS. 1 and 2, once the CAMP recognizes the media as a legacy type of media, the media content fails to be decoded and a command is issued to the Servo/Processor to play the media. In the alternative case of an original and genuine non-TIRIScypher DVD media, (i.e. in circulation before TIRIS cypher encrypted material), the player/reader would detect earlier type excluded DVD embedded date codes and grant a limited number of play accesses. Beyond this number of plays, (tracked with run counter in transponder userbit data field, see FIG. 1), a trade-in and upgrade message could be displayed for the purchase of conforming media or the payment of an incremental 'use' license.

This scheme would effectively deliver pirated media material to the copyright owners for further action and allow legitimate owners to have their material conformed, while supplying valuable demographic information to copyright owners. The foregoing combination of hardware, firmware/software sub-system methodology may be referred to as the "TIRIScypher subsystem" for copyright protection of branded content.

Another major copyright use problem is one of making a digital or analog copy of a disk onto another media type. Here again if the user is employing a legal copyright protected or even an unprotected disk, it is assumed that he will have full access to the MPEG data stream. According to another embodiment of the invention, the best deterrent to copying this digital data is a combination of using a 1394 data bus with restricted access to data that is a digital recording device. This can be built into the memory device registers of the logical layer of the destination peripherals, an existing part of the IEEE specification for ISO-1394. Another method which can be implemented in tandem is to only output fully decoded MPEG streams on this 1394 bus so that it would be impractical or economically unjustifiable to a large fixed storage device or multiple removable media as a suitable "digital bucket".

FIG. 2, shows a rewritable or recordable(RAM) version of the System Block of FIG. 1. The RAM version functions similarly to FIG. 1.

The invention outlined below addresses the copyright and secured access protection issues for the DVD, next generation compact/optical disks, which would essentially be storing high value, high quality, digitally compressed content. For the purpose of simplicity, the discussion here is limited to DVD type material only, however, the scope of the invention herein is much broader, which may include other packaged media types with associated players/appliances. In addition, the transponder could have read-only or read/write capability, with single or multiple page bit capacity with the cost constraints and/or system requirements actually defining those parameters.

What is claimed is:

1. A method of insuring only copyrighted material is playable or usable in any digital media system comprising the steps of:

integrating a radio-frequency interrogator with a media player, having I/O ports, for transmitting an interrogation signal to a transponder and for receiving a transponder response signal in response;

attaching a transponder to a predetermined media element wherein said media element has a digital media content stream and wherein said transponder transmits a transponder response signal comprising decryption algorithms in response to receipt of said interrogation signal;

receiving a transponder response signal and providing said decryption algorithms to a processor;

configuring said processor according to said decryption algorithms in order to process said digital media content stream.

2. The method according to claim 1, wherein said configuring comprises the steps of:

downloading said decryption algorithms to a non-volatile memory wherein the output of said non-volatile memory is input to said processor.

3. The method according to claim 2, wherein said non-volatile memory is a Flash ROM.

4. The method according to claim 1, wherein said configuring comprises the steps of:

providing information to configuring the I/O ports.

5. A method of insuring only copyrighted material is playable or usable in any digital media system comprising the steps of:

integrating a radio-frequency interrogator with a media player, having I/O ports for transmitting an interrogation signal to a transponder and for receiving a transponder response signal in response;

attaching a transponder to a predetermined media element wherein said media element has a digital media content stream and wherein said transponder transmits a transponder response signal comprising pointers for decryption algorithms in response to receiving said interrogation signal;

receiving a transponder response signal and providing said pointers for encryption algorithms at some predetermined address to said media player;

reading said encryption algorithms at said predetermined address or some predetermined location and providing them to a processor;

configuring said processor according to said decryption algorithms in order to process said digital media content stream or provide information on access to configuring the I/O ports.

6. The method of claim 5, wherein said configuring of said processor comprises the steps of:

providing instructions to a processor on how to configure itself to play or use the media element.

7. The method according to claim 5, wherein said configuring comprises the steps of:

downloading said decryption algorithms to a non-volatile memory wherein the output of said non-volatile memory is input to said processor.

8. The method according to claim 7, wherein said non-volatile memory is a Flash ROM.

9. The method according to claim 1, wherein said configuring comprises the steps of:

providing information to configuring the I/O ports.

* * * * *